March 11, 1969   N. C. DAHL   3,431,812
FIXED FORCE LEVEL NUT

Filed Jan. 30, 1968

INVENTOR.
NORMAN C. DAHL
BY
Crowley, Kiely & Stevens
ATTORNEYS

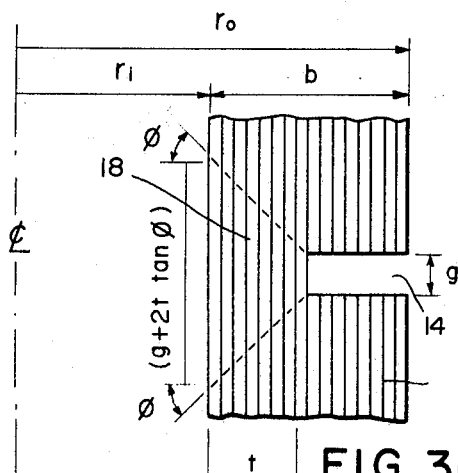
FIG. 3a
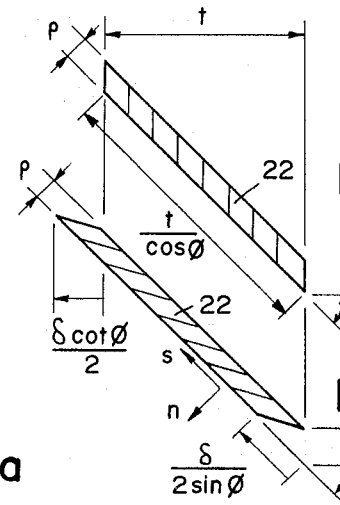
FIG. 4a
FIG. 4b
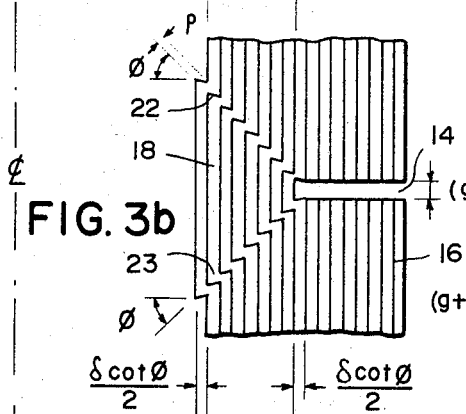
FIG. 3b
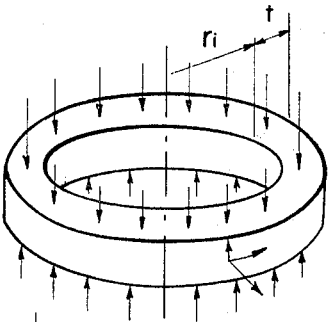
FIG. 5a
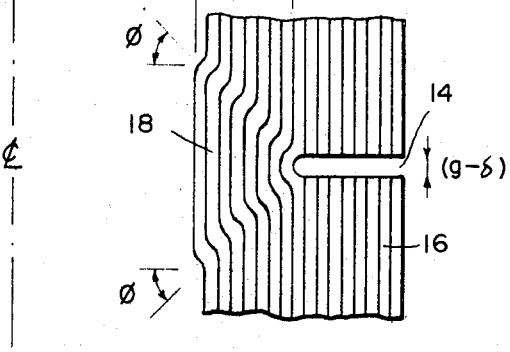
FIG. 3c
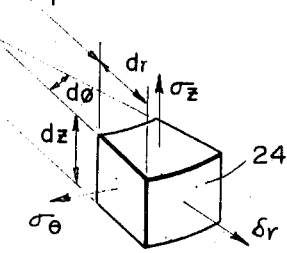
FIG. 5b
INVENTOR
NORMAN C. DAHL
BY
Crowley, Kiely & Stevens
ATTORNEYS United States Patent Office 3,431,812
Patented Mar. 11, 1969

3,431,812
FIXED FORCE LEVEL NUT
Norman C. Dahl, 40 Fern St.,
Lexington, Mass. 02173
Filed Jan. 30, 1968, Ser. No. 701,698
U.S. Cl. 85—62          8 Claims
Int. Cl. F16b 31/02

ABSTRACT OF THE DISCLOSURE

A nut which has a non-threaded portion or extension at one end thereof and an external annular groove formed on the outer peripheral wall of this extension with flowable incompressible material placed within the groove. The extension is below the threaded section and the bearing surface of this section is conical and such that the outer edge of the bearing surface first contacts the abutting surface. The bottom of the external annular groove and the internal surface of the non-threaded extension define a yielding section therebetween. When subject to a predetermined bolt force the yielding section plastically deforms inwardly, and the external groove closes extruding the flowable material therein.

Background of the invention

This invention relates to the problem of tightening a nut on a bolt in such a manner as to insure a predetermined axial force in the bolt substantially independent of the friction between the various surfaces or the presence of any locking provision on the nut.

In tightening bolts and nuts to clamp abutting surfaces, it is always desirable to tighten the bolt until the load it was designed to carry is reached. If the bolt is not tightened enough the abutting surfaces may slide on one another or, if the bolt is subjected to alternating loads, the bolt may fail due to fatigue after an unexpectedly small number of alternations of load. If the bolt is tightened too much, it may fail due to excessively high stresses.

The common method to determine the load carried by a bolt is to use a torque wrench to measure the torque applied to the bolt during installation. The required installation torque is determined by empirical data from torque versus bolt load tests in the laboratory where the bolt load can be measured directly by suitable instruments. This method is satisfactory where the installation conditions can be duplicated in the laboratory but, unfortunately, in most cases this is difficult and in some cases impossible because the installation conditions cannot be predicted with accuracy. For example, the installation torque is influenced by such factors as the materials used in the bolt and nut, the smoothness of the machining of the threads, the type of plating, the lubricant used, the surfaces on which the bolt and nut bear, and the self-looking torque built into either the nut or bolt. A thirty or forty percent error in predicting the effective overall coefficient of friction is not uncommon and this error is reflected directly in the load carried by the bolt. A further difficulty with this method lies in the fact that there is no direct way to determine whether an installed bolt carries its design load; a torque wrench can be applied to check the installation torque but in the absence of experimental data on torque versus load under these conditions the value of the bolt load will remain in some doubt.

Another method to measure load is to calibrate the deformation of a bolt head under a given load condition. As disclosed in U.S. Patent No. 2,543,705, the bolt head elastically deforms and closes slots in the bolt head, which deformation is then measured with an instrument. In U.S. Patent No. 3,194,015, a recess in the lower surface of either a bolt head or a nut is brought closer to the abutting surface by plastic deformation resulting when a specified axial force causes yielding; and the closure is either measured by feeler gauges or estimated by eye.

Torque and load indicators which employ stress sensitive materials have also been suggested. U.S. Patent No. 3,224,316 shows a bolt head or a nut in which there is a cylindrical recess filled with a stress sensitive material which either fractures, changes color or generates a voltage when the walls of the recess move relative to each other under the action of a specified torque or of a specified axial load.

Load indicating members in the form of washers which undergo plastic deformation is another approach which has been pursued. U.S. Patent No. 3,174,386 shows a washer consisting of a cylindrical section integrally formed with two disk shaped end section and of such proportions that when a specified axial load is applied the cylindrical section plastically collapses outwards. U.S. Patent No. 3,306,154 shows a washer of similar structural shape but proportioned such that the cylindrical section plastically collapses inwards.

The methods which require measurement of the deformation of a bolt head or a nut are not satisfactory because frequently such measurements are difficult to obtain, either because of the accuracy required or because the location makes measurement virtually impossible. The use of stress sensitive materials has several drawbacks, such as high cost of manufacture and the probability of erratic loads resulting from the reaction of the material to stress concentrations or unsymmetrical loading during installation, and thus far there are no nuts or bolts of this type which have gained any significant commercial acceptance. Integrally formed washers have the difficulty that the cylindrical section is close to the surface of the bolt and thus there may be a poor distribution of bearing stress under the bolt head or nut unless the cylindrical section is completely collapsed so the end sections bear against each other. Some washer units get around this difficulty by the combination of using heavy washers and two concentric cylinders but this results in an expensive unit with several parts.

Summary of the invention

I have discovered a simple, economic design for a nut which under all conditions will give an easily recognizable signal when a predetermined design axial load has been reached in the bolt on which the nut is tightened and which will produce a desirable distribution of bearing stress between the nut face and its abutting surface.

In my invention the nut has the same number of threads as a standard nut but there is an extension below the threaded section and this extension has an internal cylindrical bore with typically, a diameter slightly larger than the major diameter of the nut threads. The bottom surface or face of the nut is conical such that the outer edge of the nut face first contacts the abutting surface. An external annular groove of small width is formed in the outer peripheral wrenching surface of the extension section of the nut. The radial thickness between the bottom of the external annular groove and the internal cylindrical surface is made such that when the nut supports a specified axial load plastic deformation occurs in a wedge shaped region between the bottom of the groove and the internal cylindrical surface with the result that the nut material in this region moves radially inward and allows the external annular groove to become thinner. Experiments show that the desired radially inward plastic deformation occurs only when the axial width of the groove is less than approximately twice the radial thickness. Flowable incompressible material is put in the external groove and this material is extruded when the groove decreases in width to signal that the specified bolt force has been reached.

An important advantage of this invention lies in the fact that the nut can be easily and accurately inspected visually after installation. If the flowable material is extruded the inspector can be certain that the bolt carries a given minimum load within a small tolerance variation. Of course, if desired, the incompressible material need not be placed within the external groove and the closing of the groove can be determined by visual means or the use of a feeler gauge.

Another important advantage lies in the fact that the flowable material in the external groove can be made electrically conducting so the extruding material is capable additionally of closing an electrical circuit to signal that the bolt carries its design load. This can be accomplished, for example, by having the extruding material contact a circuit terminal located in the wall of the wrench which applies torque to the nut, as described in my copending application, Ser. No. 655,546, filed July 24, 1967, now U.S. Patent No. 3,383,961. The resulting electrical signal could be used in various ways, such as to turn on a light on a hand wrench or to shut off a power wrench.

Since it is possible that during its life the nut may be subjected temporarily to a load well above the design load it is necessary to have protection against excessive plastic deformation which would occur under such high loads. When the external annular groove closes completely, the nut thereafter behaves as a regular nut and will not plastically deform further. Thus, the width of the external groove limits the amount of plastic deformation and thereby provides the required protection against overloads. Typically, the width of the groove will be made some small fraction of the thread pitch so that after extrusion begins the operator will need to rotate the nut through only a fraction of a turn to bring the surfaces of the groove into contact. Alternatively, the operator or inspector can check the closure of the groove by removing all extruded material and then giving the nut an additional small rotation and observing whether additional material is extruded.

The conical nature of the face of the nut is an important feature of the invention since without this the maximum bearing stress between the nut face and its abutting surface would be unacceptably high. If there is a desirable uniform bearing stress distribution acting up on the face of the nut then this stress distribution acts in couple with the downward acting stress distribution on the yielding section to produce a twisting effect distributed around the circumference of the portion of the extension below the groove. It then rotates through a small angle such that the outer edge of the nut face moves up relative to the inner edge. The angle of the conical face as manufactured is made equal to or slightly larger than the expected angle of rotation under the design load, so there will be substantially uniform contact and bearing pressure between the nut face and its abutting surface.

If the nut face, as manufactured, were made planar and not conical, then the nut face and the planar surface would be in intimate contact without any rotation of the lower portion of the extension. A consequence of this would be that the lower portion of the extension could not be under any twisting effect since it did not rotate and therefore the resultant of the upward acting bearing stress distribution on the nut face would have to be located on the same circumference as the resultant of the downward acting stress distribution on the yielding section. Since the yielding section is located adjacent to the internal cylindrical surface, the result would be that the bearing stresses would be concentrated towards the inner part of the nut face and high bearing stresses would occur.

The external annular groove is formed in the external wrenching surface of the nut so that when the nut is being tightened there is preferably torque applied to the nut wrenching surface below as well as above the external groove and thus there is substantially no torque acting on the yielding section located between the bottom of the external groove and the internal cylindrical surface. As a result, the stresses in the yielding section are primarily due only to the effect of the axial bolt force and therefore the onset of plastic yielding is controlled mainly by the magnitude of the axial load and is only very weakly influenced by large variations in friction.

Thus, my fixed force level nut provides clear visual indication and inspectability, the option of electrical indication, overload protection, reasonable cost and dependable accuracy in the presence of variable friction.

Brief description of the drawings

FIGS. 3a, b and c are enlarged sectional views of the yielding section of FIG. 1 showing, respectively, the section as manufactured, a theoretical model of the plastic deformation of the section and the plastic deformation as it is observed experimentally;

FIGS. 4a and b show the upper shear zone of FIG. 3b before and after the plastic deformation;

FIGS. 5a and b show a theoretical model of the stresses acting on a section incorporating the yielding section and on an infinitesimal element within the model;

Description of the preferred embodiments

Figure 1A:
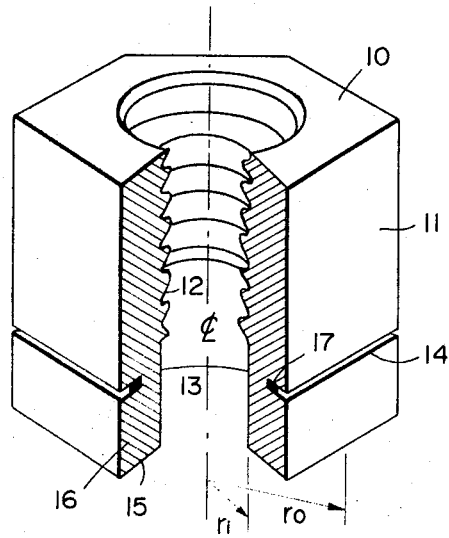
FIGS. 1a and b are isometric sectional and diametric sectional views of a nut.

In FIGS. 1a and b is a nut 10 having a hexagonal outer peripheral wrenching surface 11 and an upper internal threaded section 12 of length L and and a lower internal cylindrical section 13 of radius $r_1$. The length L is typically equal to the height of a standard nut. At a distance c below the internal threaded section 12 there is cut in the outer peripheral wrenching surface 11 an external disk shaped annular groove 14 of width g and of inner radius $r_1+t$. A flowable incompressible material 17 partially fills the groove 14. The width g of the groove 14 together with the radial thickness t between the bottom of the groove 14 and cylindrical surface of the section 13 define a wedge shaped ring yielding section 18, FIG. 3a. The internal cylindrical section 13 extends for a distance h below the annuar groove 14 to form a lower cylindrical section 16 which terminates in the face 15 which face is conical surface of cone angle β. The width g of the external groove 14 is made some fraction of the radial thickness t of the yielding section 18, both to insure that the desired type of plastic deformation (FIG. 3c) occurs and to limit the amount of plastic deformation that can take place, as a protection against overloads.

Figure 9A:
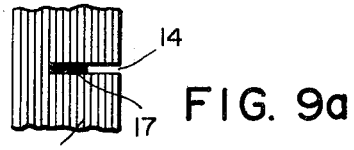
FIGS. 9a and b are enlarged sectional views of FIG. 1 which show an incompressible flowable material in the external annular groove as manufactured and the extrusion of this material as the volume of the groove decreases due to plastic deformation of the yielding section.
Figure 9B:
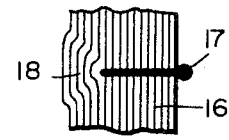

When the nut 10 is threaded on a bolt (not shown) and the nut is tightened so that the bolt force is less than the yield load for the yielding section 18, the strains in the nut are elastic and there is only an extremely small fractional decrease in the volume of the external groove 14. When the design axial load is reached the yield load on the yielding section 18 is reached and there is plastic deformation of the yielding section such that the yielding section moves radially inward and this allows the external groove 14 to decrease its width and extrude the flowable incompressible material 17 as illustrated in FIGS. 9a and b. The extruded material provides a clear visual indication that the bolt is carrying the load for which it was designed. The amount of closure of the external groove 14 depends upon the amount the nut is rotated after plastic deformation begins. When the groove 14 has been completely closed, no further plastic deformation of the yielding section 18 will occur at any bolt load, providing protection against overloads. Also, as the bolt force increases to the point where the yielding section 18 deforms plastically inwardly, the cone angle $\beta$ decreases until the face 15 is flush with the bearing surface member it is abutting, thereby achieving a substantially uniform bearing stress on the face 15.

Figure 2:
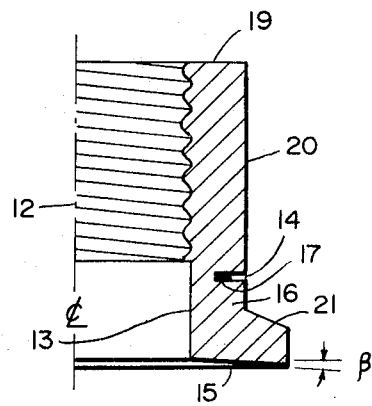
FIG. 2 shows a sectional view of a nut with increased bearing face area.

To avoid undue torsional stresses on the yielding section, the external groove is located on the external peripheral wrenching surface such that the wrench applies torque to the wrenching surface below as well as above the external groove. This is illustrated in the nut 19 of FIG. 2 which has a flange section 21 added to give increased bearing face area. The external peripheral wrenching surface 20 extends below the external groove 14 so a wrench will be in contact both below and above the external groove.

Figure 10:
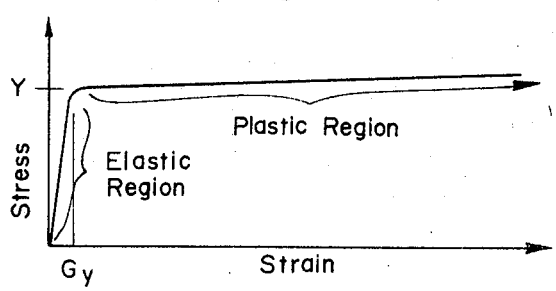
FIG. 10 shows the typical stress-strain behavior in an uniaxial tension test for the metals commonly used for nuts.

My invention is based on the following design calculations. By making use of the theorems of plastic limit analysis, see "Mechanical Behavior of Materials," F. A. McClintock and A. S. Argon, Addison-Wesley Publishing Company, Reading, Mass., 1966, pp. 364–8, it is possible to predict within small limits the bolt load at which the nut will yield. If the nut material can be assured to be rigid-plastic these theorems take on a relatively simple form. A rigid-plastic material is one which has essentially zero deformation for stresses below the yield stress and which has very large deformations when the yield stresss is reached. It may be seen from FIG. 10 that the usual nut material behaves very like a rigid-plastic material and, therefore, the yield load is predicted on the basis that the nut material is rigid-plastic with a yield stress Y.

An upper bound to the yield load is obtained by assuming a geometrically compatible mode of plastic deformation and equating the work done by the external loads acting through this deformation to the plastic work done throughout the volume of yielding material by the yield stress acting on the equivalent plastic strain increments obtained from the assumed deformation mode. The deformation mode assumed is that shown in FIGS. 3a, and b; under the action of an axial force $P_u$ the wedge shaped section 18 is assumed to develop shear regions 22 and 23 of thickness $\rho$ inclined symmetrically at the angle $\phi$ so that the wedge moves radially inwardly a distance $$\frac{\delta}{2} \cot \phi$$

while the groove 14 closes by an amount $\delta$. Referring to FIGS. 4a and b, the only plastic strain increment in the shear region 22 is the shear strain $$d\gamma_{sn} = \frac{\delta}{2\rho \sin \phi} \quad (A)$$

The equivalent plastic strain increment is $$d\bar{\epsilon}^p = \left|\frac{d\gamma_{sn}}{\sqrt{3}}\right| = \frac{\delta}{2\sqrt{3}\rho \sin \phi} \quad (B)$$

The plastic work done in the volume contained in the conical shear regions 22 and 23 is then $$W_1 = \int_V Y d\bar{\epsilon}^p dV$$

$$= 2Y d\bar{\epsilon}^p \left[2\pi \left(r_i + \frac{t}{2}\right) \rho \left(\frac{t}{\cos \phi}\right)\right]$$

$$= \frac{2\pi t \left(r_i + \frac{t}{2}\right) Y \delta}{\sqrt{3} \sin \phi \cos \phi} \quad (C)$$

When the wedge 18 moves radially inward a distance $$\frac{\delta \cot \phi}{2}$$

there is an average plastic hoop strain increment of $$d\epsilon_\phi = -\frac{\delta \cot \phi}{2\left(r_i + \frac{t}{2}\right)} \quad (D)$$

Thus, in the wedge the average equivalent plastic strain increment is $$d\bar{\epsilon}^p = |d\epsilon_\theta| = \frac{\delta \cot \phi}{2\left(r_i + \frac{t}{2}\right)} \quad (E)$$

The plastic work done in the volume of the wedge is then given to a good approximation by $$W_2 = Y d\bar{\epsilon}^p \left[2\pi \left(r_i + \frac{t}{2}\right)(g + t \tan \phi)t\right]$$

$$= \pi t(g + t \tan \phi) \cot \phi Y \delta \quad (F)$$

Equating the work done by the external axial force $P_U$ to the plastic work $$P_U \delta = W_1 + W_2 \quad (G)$$

There results the following value for $P_U$ $$P_u = \frac{2\pi t \left(r_i + \frac{t}{2}\right) Y}{\sqrt{3} \sin \phi \cos \phi} \left[1 + \frac{\sqrt{3}(g + t \tan \phi) \cos^2 \phi}{2\left(r_i + \frac{t}{2}\right)}\right] \quad (H)$$

An examination of the value (H) for $P_U$ showed that the maximum occurred very close to $\phi = 45°$ and, further, for the dimensions and yield strengths typical of standard nuts that a reasonable mean value for $P_U$ is $$P_u = 2\pi t \left(r_i + \frac{t}{2}\right)(1.25Y) \quad (I)$$

A lower bound to the yield load is obtained by finding a stress distribution which is in equilibrium with the external loads, everywhere satisfies the equilibrium equations, and nowhere exceeds the yield condition. FIG. 5a shows the model selected in which it is assumed that there is acting a uniform axial stress $$\sigma_z = -\frac{a}{v} = -\frac{P_L}{2\pi t \left(r_i + \frac{t}{2}\right)} \quad (J)$$

and a uniform tangential stress $\sigma_\theta = -\sigma_0$ where the magnitude of $\sigma_0$ is unknown. The stresses $\sigma_r$, $\sigma_\theta$ and $\sigma_z$ acting on the differential element 24 of FIG. 5b must satisfy the following equilibrium equation $$\frac{d}{dr}(r\sigma_r) = \sigma_\theta \quad (K)$$

Substituting $\sigma_\theta = -\sigma_0$, integrating and satisfying the boundary condition $\sigma_r=0$ on the inner surface ($r=r_1$), $\sigma_r$ is found to be $$\sigma_r = -\sigma_0\left(1-\frac{r_i}{r}\right) \quad (L)$$

Satisfying the Mises yield criterion $$\sigma_r^2+\sigma_\theta^2+\sigma_z^2-\sigma_r\sigma_\theta-\sigma_\theta\sigma_z-\sigma_z\sigma_r=Y^2 \quad (M)$$

$\sigma_z$ can be expressed as $$-\sigma_z=\frac{1}{2}\left(2-\frac{r_i}{r}\right)\sigma_0+\frac{1}{2}\sqrt{4Y^2-3\sigma_0^2\left(\frac{r_i}{r}\right)^2} \quad (N)$$

Solving for an average value of ($-\sigma_z$) by taking $$r=\left(r_i+\frac{t}{2}\right)$$

and selecting the value of $\sigma_0$ which makes ($-\sigma_z$) a maximum it found that for the dimensions and yield strengths typical of standard nuts a reasonable mean value for $P_L$ is $$P_L=2\pi t\left(r_i+\frac{t}{2}\right)(1.20Y) \quad (O)$$

To summarize the results of the foregoing limit analysis, the plastic yield load on the nut will be that load which produces in the yielding section an average axial compressive stress between approximately 1.20Y and 1.25Y $$2\pi t\left(r_i+\frac{t}{2}\right)(1.20Y)<P_Y<2\pi t\left(r_i+\frac{t}{2}\right)(1.25Y) \quad (P)$$

It is to be noted that since the angle $\phi$ will be near 45° the wedge 18 will move inwards approximately $\delta/2$. If it is desired that the deformed wedge not come in contact with the threads of the bolt it will be necessary for the radium $r_1$ to be $g/2$ larger than the major radius $r_m$ of the nut threads. If it is desired that the deformed wedge press upon the bolt threads to provide locking against loosening, then the radius $r_1$ should be made equal or less than $r_m$.

Figure 1B:
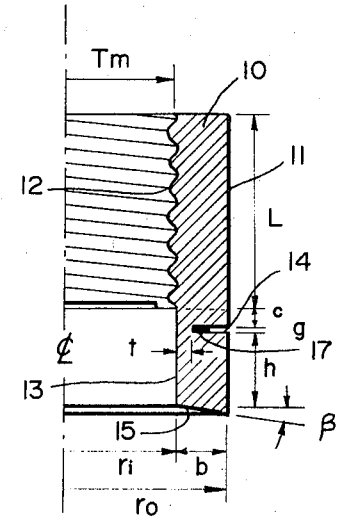

Since the wedge 18 extends above the external groove 14 by a distance approximately equal to the radial thickness $t$ of the wedge, in order that the inward radial movement of the wedge not be restrained by the threads, the distance $c$ in FIG. 1b will have to be at least equal to $t$.

Figure 7A:
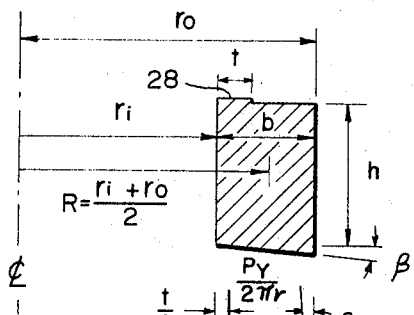
FIGS. 7a and b show the portion of the nut extension below the annuar groove when the nut face is manufactured as a conical surface and the behavior of this portion when the nut carries the design axial load.
Figure 6A:
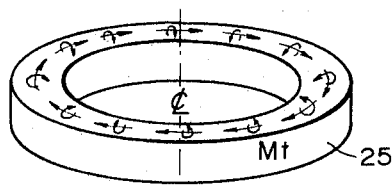
FIGS. 6a, b and c show respectively a ring of rectangular cross section subjected to a twisting effect acting uniformly around its circumference, the bending moment acting on the ring cross section as a result of the twisting effect, and the rotation of the ring cross section which results from the bending moment.
Figure 6B:
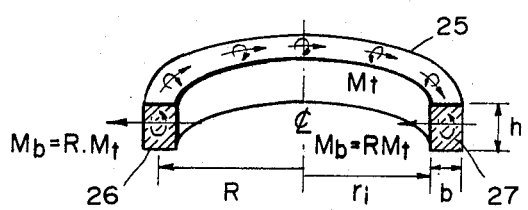
Figure 6C:
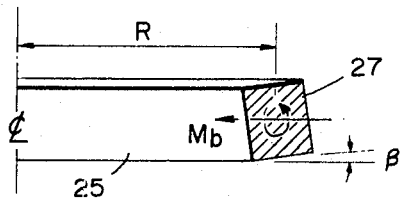

Referring to FIGS. 7a and b, it may be seen that in general the upward acting bearing stress reaction on the nut face 15 and the downward acting load resultant on the horizontal plane 28 of the yielding section will produce a twisting effect on the ring section 16. Thus the ring section 16 will be subjected to a twisting moment distributed uniformly around its circumference as illustrated in FIG. 6a, where the ring 25 is acted on by a twisting moment of $M_t$ per unit length of circumference. The nature of the solution to this problem is illustrated in FIGS. 6b and c. Any diametrical cross section of the ring is acted on by a bending moment $M_b=RM_t$ as illustrated for the cross sections 26 and 27 in FIG. 6b. Due to this bending moment the cross section 27 rotates through a small angle $\beta$ as shown in FIG. 6c, causing the bottom to move radially outward with resulting tension hoop strains, and therefore, tension hoop stresses and the top to move radially inward with resulting compression hoop strains and therefore compression hoop stresses. The maximum hoop stress (tension at the bottom and compression at the top) is given by $$\sigma_\theta = \frac{6M_t R}{bh^2}\left[\frac{\frac{b}{r_i}}{\log_e\left(1+\frac{b}{r_i}\right)}\right] \quad (Q)$$

and the rotation $\beta$ is given by $$\beta = \frac{12M_t R^2}{Ebh^3}\left[\frac{\frac{b}{r_i}}{\left(1+\frac{1}{2}\frac{b}{r_i}\right)\log_e\left(1+\frac{b}{r_i}\right)}\right] \quad (R)$$

where E is the modulus of elasticity.

For the dimensions of $r_i$ and $b$ typical of standard nuts the above relations for $\sigma_\theta$ and $\beta$ can be expressed as $$\sigma_\theta = \frac{7.5 M_t R}{bh^2} \quad (S)$$

$$\beta = \frac{12 M_t R^2}{Ebh^3} \quad (T)$$

Figure 7B:
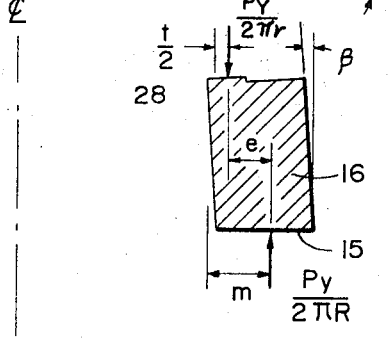
Figure 8A:
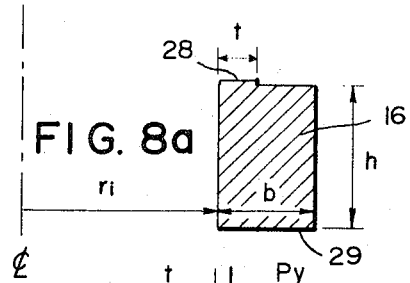
FIGS. 8a and b show the portion of the nut extension below the annual groove when the nut face is manufactured as a planar surface and the behavior of this portion when the nut carries the design axial load.
Figure 8B:
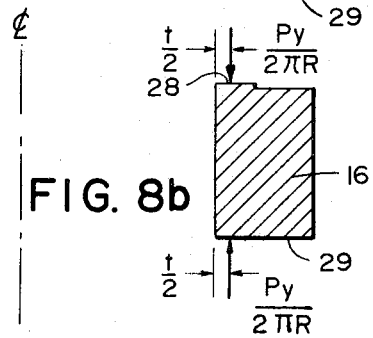

From FIG. 7b it may be seen that the twisting moment acting on the ring section 16 per unit length of circumference is $$M_t = \frac{P_Y}{2\pi R}e = \frac{P_Y}{2\pi R}\left(m-\frac{t}{2}\right) \quad (U)$$

If the bearing stress is uniformly distributed on the face 15 then $$m = \frac{b}{2}$$

and $$M_t = \frac{P_Y}{4\pi R}(b-t) \quad (V)$$

Substituting this value in equation (S) and setting the maximum bending stress equal to the yield stress Y the following is obtained for $h$:

$$h = \sqrt{\frac{7.5(b-t)P_Y}{4\pi bY}} \quad (W)$$

Thus, with a uniform bearing stress, if the maximum bending stress is not to exceed the yield stress Y, the height $h$ must be equal to or greater than the value given by equation (W). By combining equations (S) and (T), the angle rotation $\beta$ when the maximum stress is Y is found to be $$\beta = \frac{12Y\left(r_i+\frac{b}{2}\right)}{7.5Eh} \quad (X)$$

Thus, to insure a uniform bearing stress on the face 15 when the yield load $P_Y$ acts on the nut, the cone angle $\beta$ in FIG. 1b must be made equal to or greater than the value given by Equation X.

To summarize the design procedure for given design axial load $P_Y$, starting with given thread size and given external peripheral wrenching surface a nut for a material of given yield strength Y can be designed as follows:

A selection is made for the gap width $g$ of the external annular groove 14.

A decision is made on the radius $r_1$ of the internal cylindrical section 13 depending on whether clearance of, or locking engagement with, the bolt threads is desired.

The radial thickness $t$ of the yielding section 18 calculated from $$2\pi t\left(r_i+\frac{t}{2}\right)(1.20Y)<P_Y<2\pi t\left(r_i+\frac{t}{2}\right)(1.25Y)$$

The distance $c$ which the internal cylindrical section 13 extends above the external annular groove 14 is made at least equal to $t$.

For a nut with a generally straight outer peripheral wall the distance $h$ is made at least equal to $$h = \sqrt{\frac{7.5(b-t)P_Y}{4\pi bY}}$$

and the cone angle $\beta$ is made at least equal to $$\beta = \frac{12Y\left(r_i+\frac{b}{2}\right)}{7.5Eh}$$

What I claim is:
1. A one piece nut of ductile material which comprises:
a body having an upper face and a lower bearing face;

an outer peripheral wall between said faces including wrenching means thereon;

an internal wall having a threaded portion and a non-threaded portion extending from the threaded portion to said lower bearing surface, with the diameter of the non-threaded portion being at least as great as the major diameter of the threads in the threaded portion;

an external radially directed annular groove formed on the outer peripheral wall of said extending non-threaded portion, said external groove being less in axial width than twice the radial thickness between the bottom of the external groove and the internal wall, thereby defining an annular section which plastically deforms radially inward with an essentially wedge shaped cross section when a predetermined bolt force acts on the nut with resulting reduction of the axial width of the external groove.

2. The nut of claim 1 wherein the external annular groove is spaced below said threaded portion such that the internal nut threads do not prevent inward radial plastic deformation of said annular section.

3. The nut of claim 1 wherein the non-threaded portion has an extension below said external annular groove such that tangential bending stress in the extension does not exceed nut material yield stress when said predetermined bolt force acts on the nut.

4. The nut of claim 1 wherein the extension terminates in the lower bearing face, the face being conical such that outer edge of the face first contacts the abutting surface and of an angle at least equal to the rotation of said face when said predetermined bolt force acts on the nut, whereby a uniform bearing stress acts between said lower bearing face and said abutting surface.

5. The nut of claim 1 wherein the internal diameter of the non-threaded portion is greater than the root diameter of the threaded portion.

6. The nut of claim 1 wherein a flowable incompressible material is disposed within the external groove.

7. The nut of claim 6 wherein the material is electrically conducting.

8. The nut of claim 1 wherein the external groove is disposed within said wrenching means.

References Cited

UNITED STATES PATENTS

| 2,286,895 | 6/1942 | Carlson | 151—21 |
|---|---|---|---|
| 2,464,152 | 3/1949 | Ralston | 85—62 |
| 2,495,409 | 1/1950 | Costello | 151—21 |
| 2,781,687 | 2/1957 | Knocke | 85—62 |
| 3,135,154 | 6/1964 | Zenzic | 85—62 |
| 3,174,386 | 3/1965 | Lewis | 85—62 |
| 3,224,316 | 12/1965 | Grikscheit et al. | 85—62 |
| 3,306,154 | 2/1967 | Bailey | 85—62 |

FOREIGN PATENTS 854,792   11/1960   Great Britain.

CARL W. TOMLIN, *Primary Examiner.*

R. S. BRITTS, *Assistant Examiner.*